United States Patent [19]
Winiger et al.

[11] Patent Number: 5,001,654
[45] Date of Patent: Mar. 19, 1991

[54] PUBLISHING SYSTEM AND METHOD OF USING THEREIN

[76] Inventors: Werner J. Winiger, Leigrubenstrasse 7, CH-8805 Richterswil, Switzerland; Freddy J. Langelaan, Sterrenbosweg 31, 5953 GN Reuver; René F. A. Collard, Condorstraat 2, 6591 TT Gennep, both of Netherlands

[21] Appl. No.: 297,838

[22] Filed: Jan. 13, 1989

[30] Foreign Application Priority Data

Jan. 19, 1988 [NL] Netherlands ............... 8800108

[51] Int. Cl.$^5$ .................................. G06F 15/20
[52] U.S. Cl. .................................. 364/523
[58] Field of Search ... 364/518, 521, 523, 200 MS File, 364/900 MS File; 340/748

[56] References Cited

PUBLICATIONS

Robert Morris, "Is What You See Enough to Get", Protext II: Proceedings of the Second International Conference on Text Processing Systems, Dublin, Oct. 23-25, 1985, pp. 56-81.
Using Microsoft WORD vers. 3.0, "Formatting with a Style Sheet", 1986, pp. 294-318.
Workstation Publishing Software, Interleaf Reference Manual, vol. 1, Sun/Release C, Interleaf Inc., 1986, pp. 6-21, 6-22.
Workstation Publishing Software, Interleaf Training Manual, Release 2.0, Interleaf Inc., Jun. 1985, pp. 1-3-7-1-41, 3-14.

Primary Examiner—Gary V. Harkcom
Assistant Examiner—Michael A. Jaffe
Attorney, Agent, or Firm—Reed Smith Shaw & McClay

[57] ABSTRACT

In a publishing system for editing documents having a processing unit, inputting device and a display screen, the document parts (components) are provided with properties which describe their appearance, and each individual component belongs to a component type. The component types and the individual components of that type have corresponding properties, the values of which can be set by the system operator. The value of a property of an individual component is usually identical to the value of the corresponding property of that type but may also be set to differ locally therefrom. This is indicated on the screen. On a change of the value of a property of a component type the value of each individual component of that type is changed similarly unless that value had been set to be locally different.

14 Claims, 18 Drawing Sheets

PUBLISHING SYSTEM AND METHOD OF USING THEREIN

FIELD OF THE INVENTION

The invention relates to a publishing system for editing documents and, in particular, to a management program for indicating document components having local values that differ from global values of the same component type.

BACKGROUND OF THE INVENTION

Publishing systems comprising a screen, inputting means for inputting text and commands and a processing unit for editing documents are generally well known. Of general interest are "*Providing Three Kinds of Attributes For Object Data and Properties*", IBM Technical Disclosure Bulletin, Vol. 27, No. 10B Mar. 1985; C. Simonyi, Generic Coding In An Interactive Editor, Digest, Compcon 84, Feb. 27-Mar. 1, 1984, IEEE Computer Society Press (p. 99-103) and Gutknecht, Concepts Of The Text Editor LARA, communications of the Assoc. of Computing Machinery, Vol. 28, No. 9, Sept. 1985 (pages 942-960).

Typically, a document consists of one or more components characterized by a name and by properties. The properties normally have an adjustable value. For example, local values of the properties are applicable to individual components and global values of the properties are applicable to a component type (i.e., all individual components having a specific name), except for those individual components belonging to that component type for which different local values of the properties have been set. The processing unit comprises management means for managing, displaying on command on the screen and changing the value of the properties on command.

One such system that is commercially available is in the form of a computer and a software package known as the "Workstation Publishing System" by Interleaf, Inc., Cambridge, Mass., U.S.A., and is described, for example in "Is What You See Enough To Get?" by R. A. Morris (in: PROTEXT II: Proceedings of the Second International conference on Text Processing systems, Dublin, 1985, ISBN 0 906783 50X). In this system, the inputting means comprise a keyboard and a mouse. The mouse can be used by the operator to select a position on the screen, and commands or text can be inputted at that location by using the keyboard. This system also uses menus which appear locally on the screen after activation by the mouse. The menu comprises a set of commands which can be selected and executed by activation of the mouse.

A system such as that described above enables the operator to make up a document consisting of different components, such as headings, text blocks, footnotes, etc. This document is displayed on the screen in a text window provided with a margin. A label with the name of that component is provided in that margin at the start of each component.

The external characteristics of each component, such as type face and size, margin positions, typographical functions, and so on, are fixed in the properties which may have a different setting or value for each component. The set of properties of a component may be displayed on the screen in a separate window by bringing it up via a menu with the mouse at the label of that component. This window also displays the values of the properties. These can be changed by the operator. If the operator does not change them, then the values preprogrammed or default values apply. The default value can be provided by the supplier of the system or at initialization/installation.

To increase legibility, the operator will often wish to make the appearance of certain components different, e.g., by printing the heading in bold and centered on the line. This can be achieved by giving the properties of that component a corresponding value.

In the above described system, there is one basic component from which the operator can form a number of different components by giving one or more of the properties a different value. In that way the operator can define a number of components tailored to different applications in the document by means of properties which have different values from one another. By giving these components different names (the name of a component is also a property), they can be made distinguishable. A component specialized in this way can then be used at different places in a document.

At the operator's choice, a change of the value of properties of a component can be made to apply to all the components with the same name as the amended component (global change), or be applied solely to the changed component (local change).

As a result, a distinction can be made between two kinds of values of properties: the "global" value which applies generally to all components with the same name (together forming the "(component) type" of that name), and the "local" value which replaces a global value after a local change to an individual component.

In a document it is possible to make new components of an existing type by creation operations and by copying operations. In the case of a creation operation, the system makes a new component whose properties have the global values of the component type whose name has been specified by the operator. In the case of a copying action, the new component is given the same name and local property values, as a component indicated in the document by the operator using the mouse.

In the system described, if the operator changes the global value of a property of a specific component type (i.e., the properties of the first component of that type occurring in the document in the known system), the appearance of the other components of that type remains unchanged because the system locally sets the properties thereof directly to the value prior to the change. This may result in a confusing situation, since it will regularly happen that the local value of a specific property is the same for almost all of the components, but differs from the global value. In the case of a creation operation the operator will think that the component he is obtaining will have the same appearance as (practically) all the other components of the specified type, but the new component supplied by the system has the global property values and hence differs from the expected value.

Although the known system offers the opportunity of adapting both the local properties of all the components of a specific type and the global properties of that type simultaneously through a global change this may overshoot the target, because some of the local changes probably have been made to distinguish a specific component from the other ones and this step is also deleted by a global change.

Accordingly, it is an object of the present invention to provide a system such as those described above that gives the operator a better idea of the consequences of operations on the appearance of document components.

SUMMARY OF THE INVENTION

Generally, the present invention provides a system that responses to a change in the global value of a property of a specific component type by performing through the management means the same change on the corresponding property of all the individual components of that component type, except for those individual components of which the said corresponding property has a value which differs from the global value. As a result, the means of global amendment are reserved for changes in appearance which are required in the entire document, so that as a rule a newly created component will have the appearance of the majority of the components of the same type. On the other hand, changes that have been made intentionally are not erased.

Clarity is still increased in that the management means of the system of the present invention indicates in the display of a document on the screen what components have properties with a local value which differs from the global value applicable to those components. As a result, the operator can see at a glance what components have been set completely globally and what components have properties with locally different values. In order to provide the operator with information as to which set of properties that are different locally, the management means indicates in the screen display of the local value of properties of an individual component what properties have a value which differs from the global value applicable to that component.

Components are built up of sub-components, e.g., letters. A sub-component also has properties which describe its appearance. As a rule these will have values (sub-local values) identical to those of the corresponding properties of the component to which the sub-component belongs (the local values), but sometimes they will differ, for example if a single word in a paragraph is printed in bold face or in italics.

The relationship between sub-local and corresponding local values of properties is similar to that between local and corresponding global values of properties. Consequently, it is desirable to have an indication of the state of the properties of sub-components as well. This is achieved by the management means of the present invention indicating in the screen display of the value of properties of a sub-component which differ from the local value of the corresponding properties of the component in which the sub-component is situated. Thus, it is always immediately clear in what respects the associated sub-component differs from its surroundings.

Other features and advantages of the present invention will become clear from a perusal of the following detailed description of a presently preferred embodiment taken in connection with the accompanying drawings, in which like reference numerals refer to like parts.

BRIEF DESCRIPTION OF THE DRAWINGS

FIG. 1b is a block diagram showing the configuration of the system in FIG. 1a;

PRESENTLY PREFERRED EMBODIMENT

System Configuration

Figure 1A:
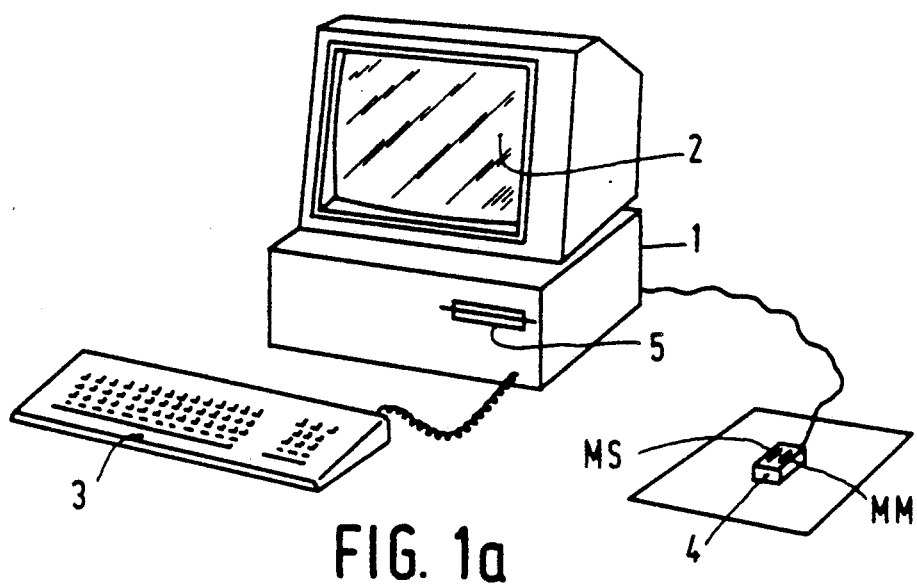
FIG. 1a illustrates a publishing system according to the present invention.
Figure 1B:
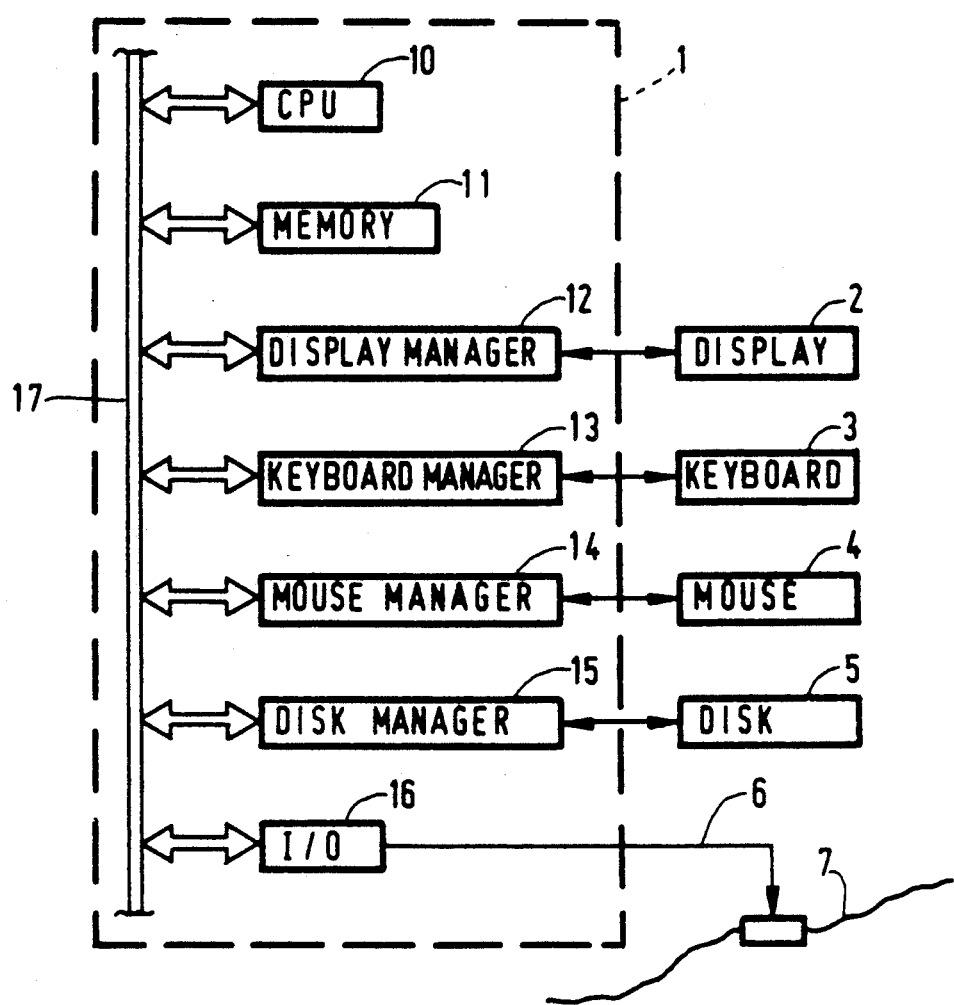

FIGS. 1a and 1b diagrammatically show the configuration of a publishing system according to the invention. This system comprises a processing unit 1, a screen 2, a keyboard 3, a mouse 4, a memory disk 5 and a connection 6 to a network 7 for communication with a printer or with other external equipment. Processing unit 1 contains a central processor 10, a memory 11, control units 12, 13, 14 and 15, for, respectively, the screen 2, the keyboard 3, the mouse 4 and the memory disk 5, and also a communications unit 16 which provides communication via the network 7 to external equipment. Units 10 to 16 in processing unit 1 are interconnected via a system bus 17.

A pointer element or cursor can be moved over screen 2 by means of mouse 4. Mouse 4 is provided with at least two press buttons MS and MM for giving commands to the system. By means of the first press button (MS) the operator can select an element indicated on the screen by the cursor, i.e., indicate that an action subsequently to be performed is to be carried out on the data represented by the indicated element on the screen. The system generally gives the operator a feedback by changing the color of the selected element on the screen.

The second press button (MM) is the menu button. When the operator presses this, the system shows on the screen at the cursor location a selection menu with system commands, one of which the operator can indicate by moving the mouse/cursor. The menu generally consists of a number of fields each of which contains a command. When the cursor reaches a field, it changes color to indicate that it is selected. When the button MM is released, the system executes the indicated command and removes the menu from the screen. If the operator moves the cursor completely outside the menu and then releases the button MM, the menu disappears from the screen and no action takes place.

A menu may have different levels, i.e., continuation menus can be called up from one or more menu fields, e.g., by moving the cursor outwards in said menu field in a direction indicated by a sign.

The use of a mouse and selection menus is known, for example, from U.S. Pat. No. 4,464,652, which describes a selection menu of the pull-down type in combination with a mouse, so that details of the technology required for this will not be discussed here.

The functions described here can of course be embodied by means other than a mouse, e.g., a joystick or function keys on the keyboard.

Document Model

Figure 2:
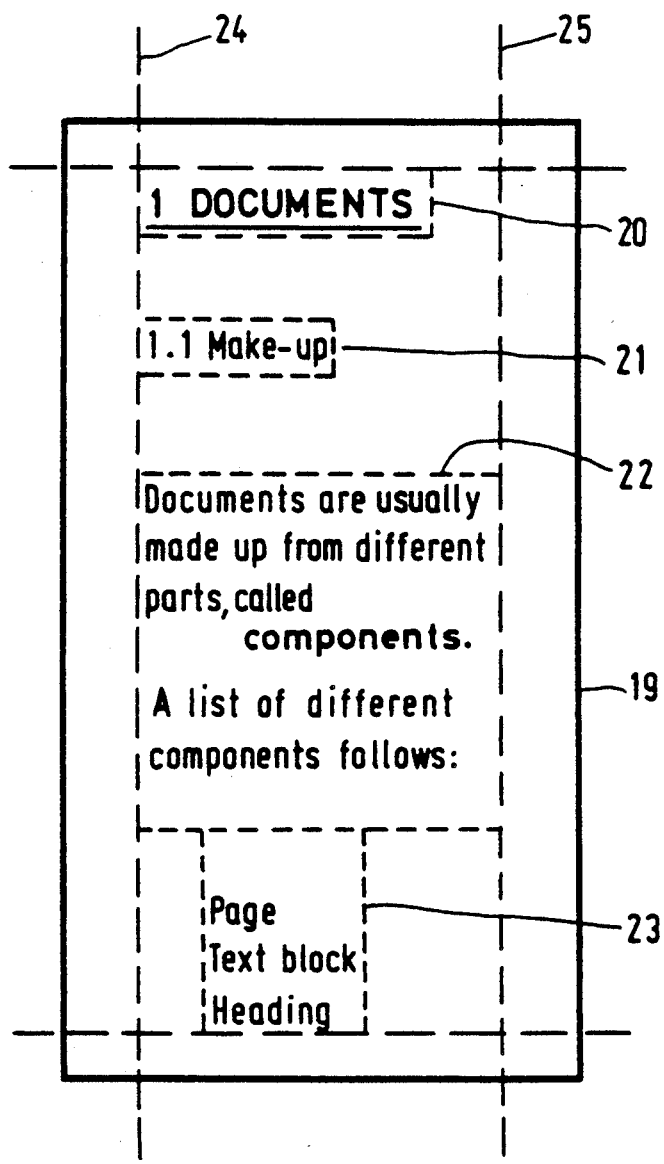
FIG. 2 is an example of a document.

FIG. 2 shows an example of a document with reference to which an explanation will be given of the model for documents used in the system according to the invention.

The document in FIG. 2 comprises five components, i.e., a page 19, a heading 20, a subheading 21, a text block 22 and a table 23.

Components have a name, a content and properties. The content is formed by text or a graphic display. The properties determine the appearance of the component. The name, the content and the value of the properties of a component can all be filled in and amended by the operator.

The document model of the system according to the invention has various component kinds which differ from one another in respect of their usability in a document, such as "page", "heading", "test block", and so on. The different component kinds have properties coordinated with their function, e.g.:

- For a "page": marginal lines, layout parameters for fixed additions ("headers", "footers"), printer instructions;
- For a "heading": layout parameters, automatic numbering;
- For a "text block": layout parameters, location with respect to page margin; and so on.

Different component kinds thus have different properties as a result of their different functions. Some of them are completely independent and others are defined precisely with respect to the properties of other component kinds, e.g., the location of a "text block"is defined with respect to the margins of the "page".

Component types arise from filling in values for the name and properties. For example, within the "page"-component kind it is possible to form the types "front page", "text page" and "back page" by filling in the value of the properties in different ways. The name of a component type should distinguish the resulting component types from one another. In the example of FIG. 2 the components 20 and 21 both belong to the "heading" kind, but component 20 is of the "main heading" type and component 21 is of the "sub-heading" type. These types differ from one another as a result of the different value of the "style" property: bold or normal. Similarly, the components 22 and 23 both belong to the "text block" kind, but component 22 is of the "text" type and component 23 of the "table" type, these types differing from one another in respect of their location relative to the margins 24 and 25 (the location of which is fixed in the properties of the "page" 19).

Different component kinds and component types are pre-programmed as standard in the system according to the invention. These give sufficient facilities for normal text processing. The advantage of this is that in this way some uniformity can be obtained in the finished product ("house style").

Individual components which occur in a document are representatives of a certain component type and their properties are in principle filled in the same way as for that component type. Nevertheless it is possible that the filled-in value of one or more properties of a specific component is changed by the operator while the name remains unchanged, whereafter the value of the properties of that specific component differs from the value of the properties which were specified for that component type. In this context reference is made to local values of properties (i.e., valid for a specific individual component) and global values of properties (i.e., valid for a component type).

Thus the global property value "bold face" can be specified for a "heading" component type, but the local property value "normal type face" for a specific heading in the document. That specific heading will therefore deviate locally from the global value for the "style" property (but follow the global definitions in all other properties).

Sub-components, e.g., individual alphanumerical characters within a component, in turn have properties. Their value is generally equal to that of the corresponding properties of the component in which they are situated, but they may differ therefrom.

The properties of the characters thus have the same relationship to the properties of the component as local properties of a component have to the global properties of the component type. The values of the properties of the characters are referred to here as sub-local.

Management System

The content and the properties of the components are managed by a management program which runs in central processor 10 and memory 11 of the system. This management program manages the properties of the component types, of the individual components and of the sub-components separately. In the system described here management of the properties of components (the local values) is carried out by reference to an amendment list which indicates what local deviations there are with respect to the global values of the properties. Similarly, the management system manages the deviating properties of sub-components as amendments to the local values of the properties of the component. This could, however, also be embodied in some other way.

By means of the management program the operator can make changes to the filled-in value of properties, both global and local. The procedure for this will be described hereinafter.

A local change means that a property is withdrawn from the global value regime, i.e., when the operator changes the global value of a global property E of a certain component type the management program carries out this change for all the components of that type with the exception of those components in which the property E has been locally set. On the other hand, the local change of the value of a property F in a specific component of type T has no effect on the value of the property F of other components of that same type T.

If the operator wishes to transfer a specific component from one document to another, the management system checks whether there is already a component type with the same name present in the destination document. If not, the management system defines in the destination document a component type by name and properties of the component to be transferred and places it in the document. If, however, a component type with the name of the component to be transferred is already present, the management system gives the operator the choice of either adapting the component to be transferred to the global values of the properties of the component type already present, or of retaining the original appearance of the component to be transferred and storing the values of its properties as being locally different.

Presentation of a Document

Figure 3:
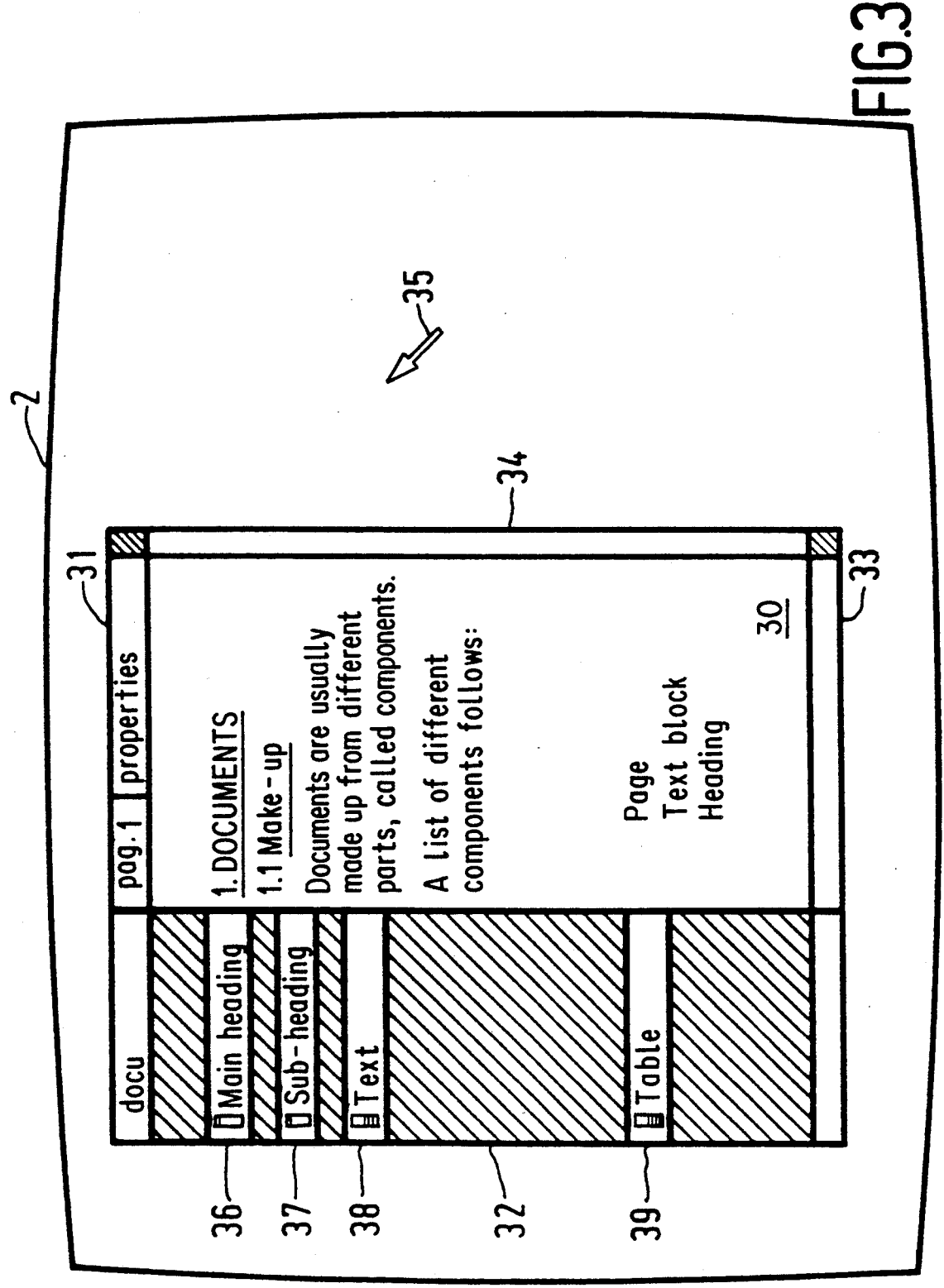
FIGS. 3 to 6 are screen displays of a system according to the invention during use.

FIG. 3 shows the screen 2 of a system according to the invention, displaying thereon the document shown in FIG. 2. The text of the document or a part thereof is displayed in a text window 30 surrounded by a frame made up of a top frame 31, a left-hand frame 32, a bottom frame 33 and a right-hand frame 34. The cursor 35 is also present on the screen 2. The top frame 31 is divided into a number of compartments containing the identification of the document, the page number and one or more command fields.

The left-hand frame 32 contains a number of labels 36 to 39 which are disposed at the start of each component and which contain the type name of that component and/or an associated identification symbol. If a specific component has local deviations from the properties of the component type, the system places an asterisk in the label of that specific component so that the operator immediately knows that this is a locally deviating component.

Figure 4:
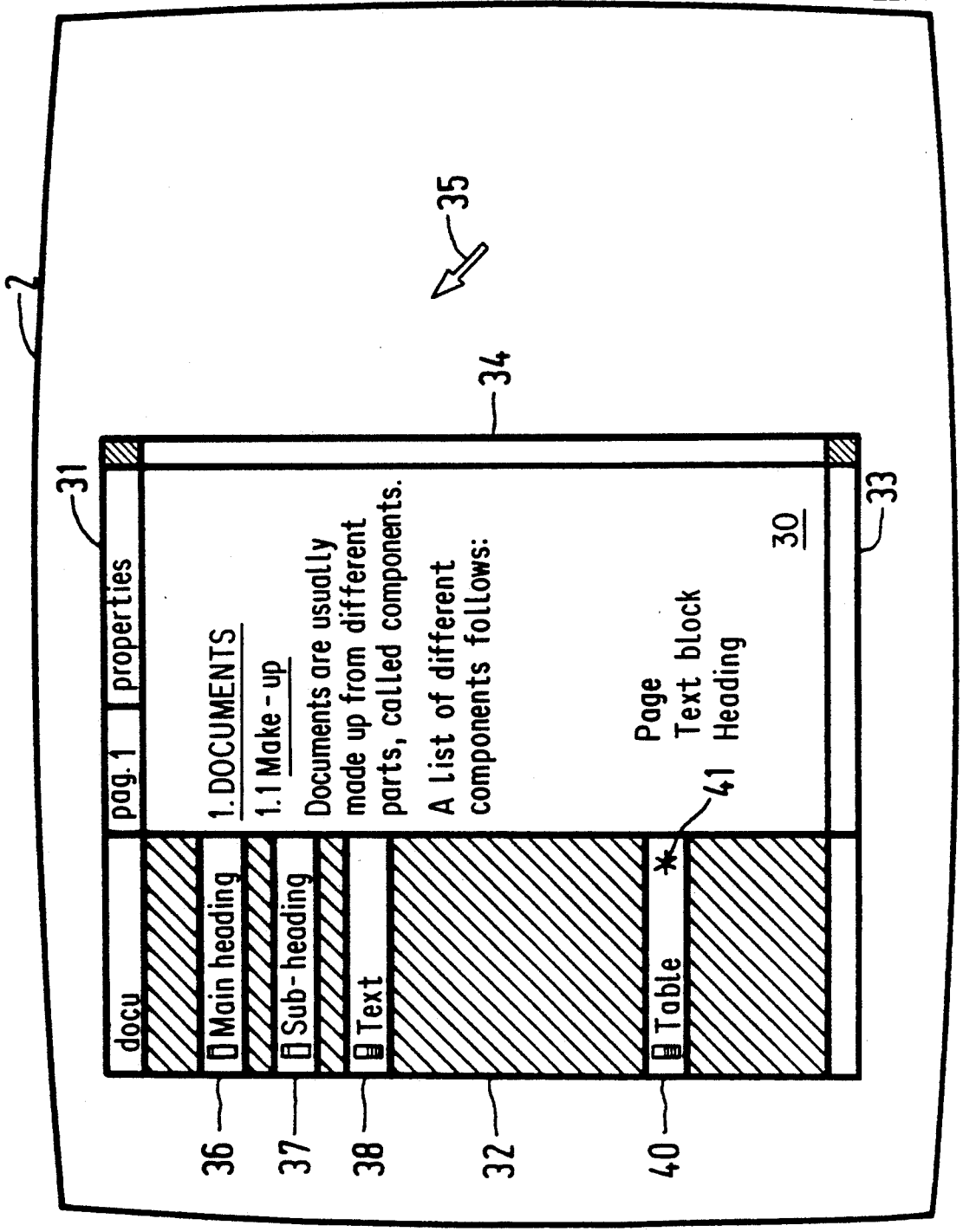

This will now be explained in greater detail with reference to FIGS. 3 and 4. FIG. 3 shows a component of the "table" type (23) and of the "text" type (22). Both are of the "text block" kind and have properties set to different values in respect of location relative to the margin and width. These properties have global values. As an alternative, the system offers the opportunity of forming the component 23 from the "text" type by locally changing the value of the associated properties just for that individual component 23. If this had been done so, then the component 23 would have been of the "text" type with some locally differently set properties and the screen representation of the document would have had the appearance shown in FIG. 4. In this the associated component has the label 40 with the name "text" and an asterisk 41 therein.

FIG. 3 also shows the bottom frame 33 and the right-hand frame 34. These contain scroll bars by means of which another part of the document can be placed in the text window 30 by means of the cursor 35. The use of scroll bars is generally well known and will not be described herein.

Presentation of the Properties of a Document

Figure 5:
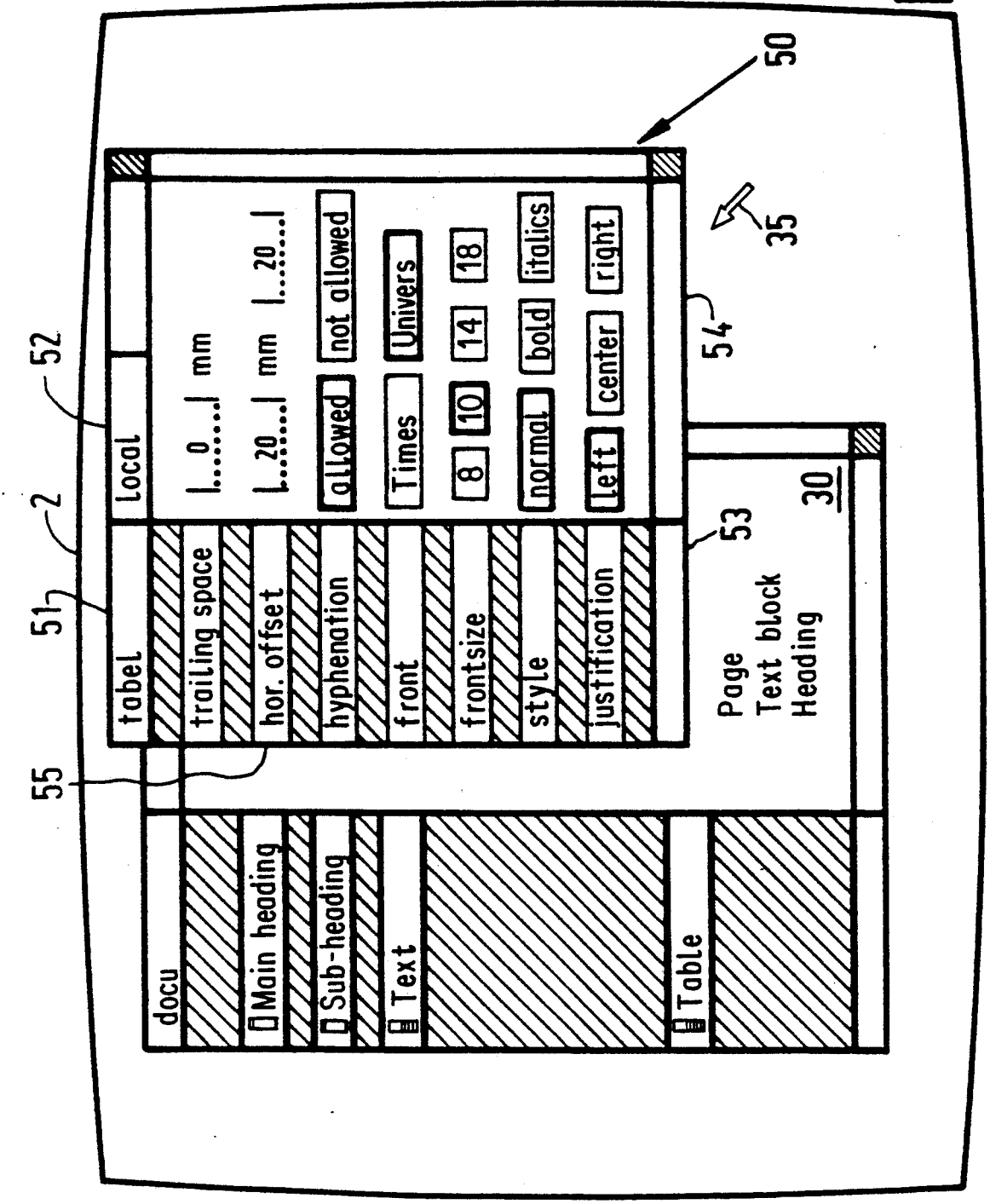

FIG. 5 shows the screen 2 of a system according to the invention displaying thereon the properties of a component, in this case those of the component "table" in the document of FIG. 2. The call-up of the properties of a component by the operator will be discussed hereinafter.

The properties are displayed by the system in a properties window 50. It partially overlaps the text window 30 of the document to which it relates. The properties window 50 has at the top a name bar 51, stating the type name of the component, "table" in this example. The name bar 51 also contains a field 52 for indicating whether the properties displayed are local or global.

The properties window 50 is divided up into a left-hand part 53 giving the identifications of the various properties in labels, and a right-hand part 54 giving the set values of those properties. For example, the property "trailing space" which indicates the space to be left blank beneath this component, is set to 0. This means that the component must be followed by the next component without any intermediate space. The property "horizontal offset" indicates the distance between the margins of the component and the page margins (defined in the page properties), on both the left and right. This property is set to 20 mm left and 20 mm right, which means that the component lines must start 20 mm to the right of the left-hand margin of the document and stop 20 mm to the left of the right-hand margin of the document.

In the case of properties for which there is only a small number of options, the value set is indicated in some other way: all the possible settings are shown in the right-hand part of the properties window and the set value is indicated by a blackened frame. It should be noted that the form, selected properties, and their possible setting as shown in FIG. 5 are intended solely as an example.

Figure 6:
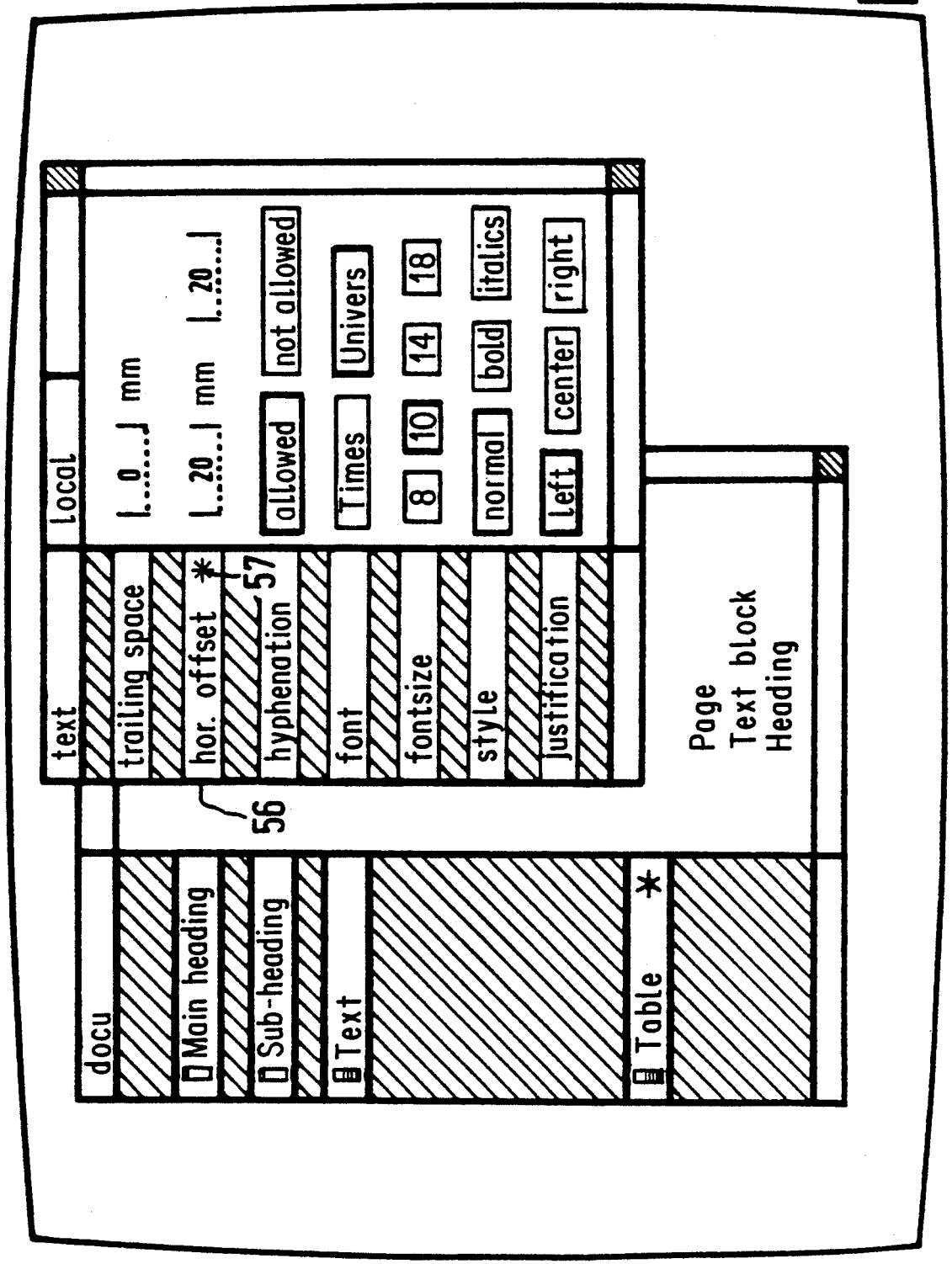

The presentation in FIG. 5 corresponds to the system setting as shown in FIG. 3, in which there is a "table" component type. If there were no separate "table" type, but, as discussed in connection with FIG. 4, the component concerned was defined in the document as of the "text" type with local deviations, the presentation of the properties would have the form shown in FIG. 6.

In this case the property "horizontal offset" has a value deviating from the global value, because component 23 (FIG. 2) has a different distance from the page margin than the component 22 (FIG. 2) that fully satisfies the global properties. To clarify to the operator that the property "horizontal offset" has a locally amended value, the label 56 of this property bears an asterisk 57.

Presentation of the Properties of a Sub-component

A properties window can be displayed even for sub-components, such as the individual alphanumerical characters in a component. The properties shown in this form a sub-set of those of the component. If the values thereof differ from those of the corresponding component properties, the associated labels in the left-hand part of the properties window will again bear an asterisk.

Operating Procedures

The operation of the system will now be described with reference to operating procedures for system actions associated with the invention.

The actions of the operator are always shown on the left and the system actions initiated as a result are always shown on the right in FIGS. 7a, 8a, 9a, 10, 11a and 12a.

Calling Up Properties of a Component Type

Figure 7A:
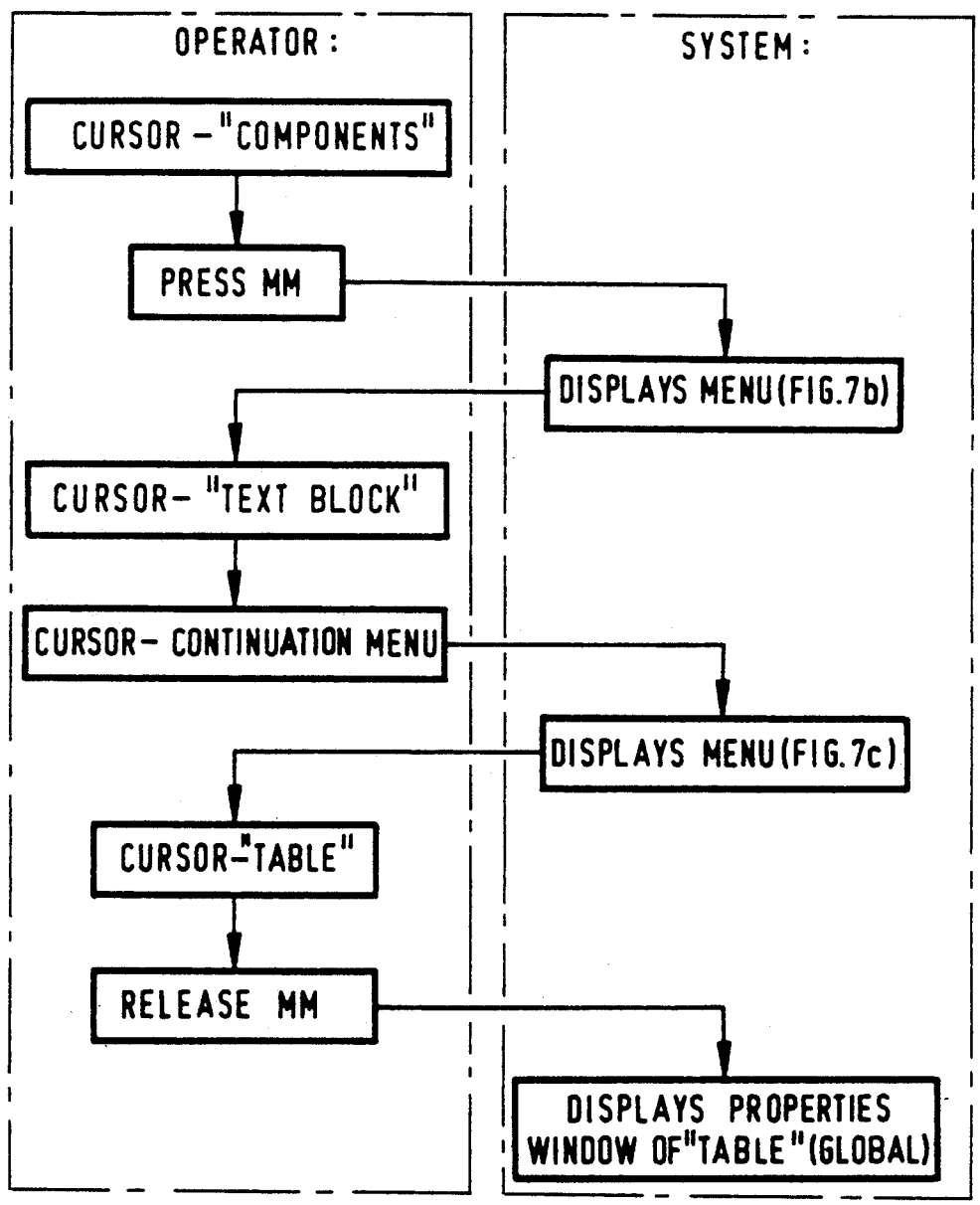
FIG. 7a is a diagram of a procedure for calling up properties of a component type.

The procedure for displaying on the screen the properties of a specific component type and their set (global) value is shown in FIG. 7a. The example selected is the display of the properties of the component type "table" in the document of FIG. 2.

Figure 7B:
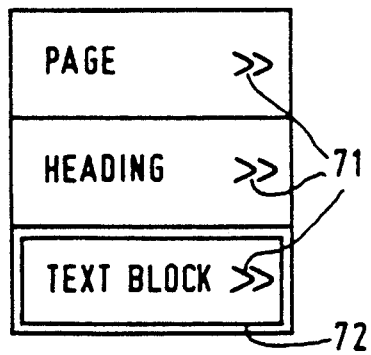
FIGS. 7b, 7c, 8b, 9b, 11b, 11c, 12b, 12c, 13b, 13c and 14b illustrate menu selections displayed on the screen in connection with one of the associated procedures described in relation to a figure of like number.
Figure 7C:
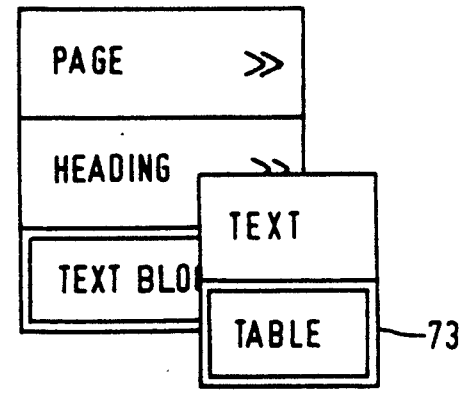

The procedure starts with the operator placing the cursor in the "properties" field of the top frame 31 (see FIG. 3) of the text window 30 (see FIG. 3). The operator then presses on the mouse menu button MM, whereupon the system displays on the screen at the cursor a menu with all the available components kinds. This menu is shown in FIG. 7b. An arrow symbol 71 is provided in this menu for all the kinds and indicates that a continuation menu can be displayed here. Such a continuation menu shows all the component types belonging to that kind. The operator now moves the cursor which has assumed the form of a frame 72 or a change of color of the menu field, to the menu field "text block" and moves the mouse in the direction of the symbol 71, whereupon the system displays the continuation menu 73 (FIG. 7c). In this continuation menu the operator moves the cursor to the field "table". On release of the mouse menu button the system now calls up the properties of the component type "table" and displays them in a properties window on the screen.

Calling Up Properties of an Individual Component

Figure 8A:
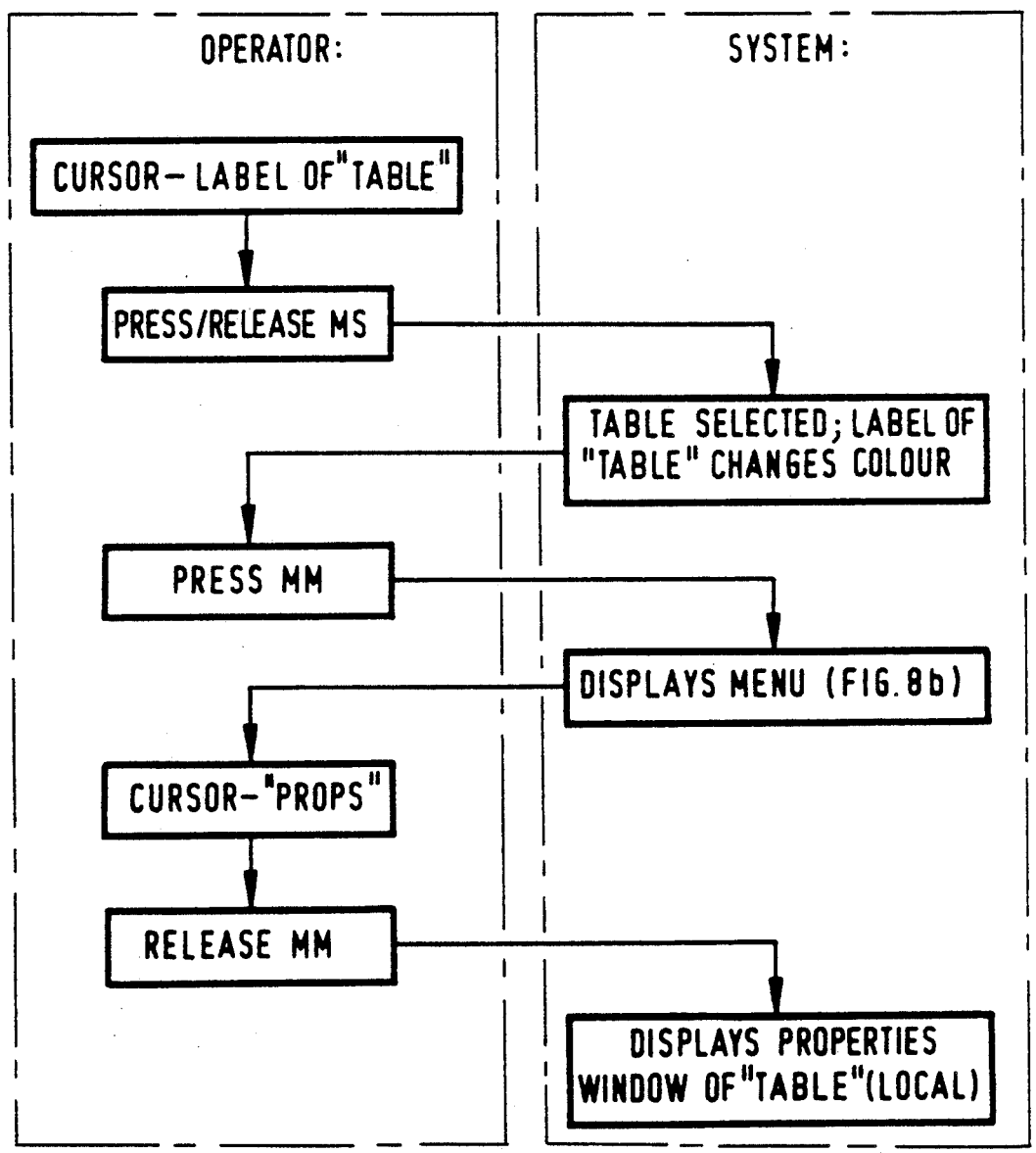
FIG. 8a is a diagram of a procedure for calling up properties of an individual component.
Figure 8B:
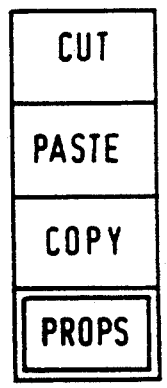

The procedure for displaying the properties of an individual component and their set (local) value on the screen is shown in FIG. 8a. As an example, the same component "table" has been selected as in the previous case. The operator brings the cursor to the label 39 of the component "table" in the left-hand frame 32 of the text window 30 (see FIG. 3). By pressing and releasing the mouse selection button MS the component is selected. The system then changes the color of the associated label to show that the selection has been made. The operator then presses the mouse menu button MM whereupon the system shows at the cursor the menu illustrated in FIG. 8b. In this menu the operator points to the "PROPS" field with the cursor and then releases the menu button MM. The system now calls up from the memory the global property values of the component type "table"and the amendments list with local changes valid for the individual component indicated, in so doing complies the locally valid properties list of the associated component, and displays this list in the properties window on the screen.

Change of Global Value of Properties

Figures 9A, 9B:
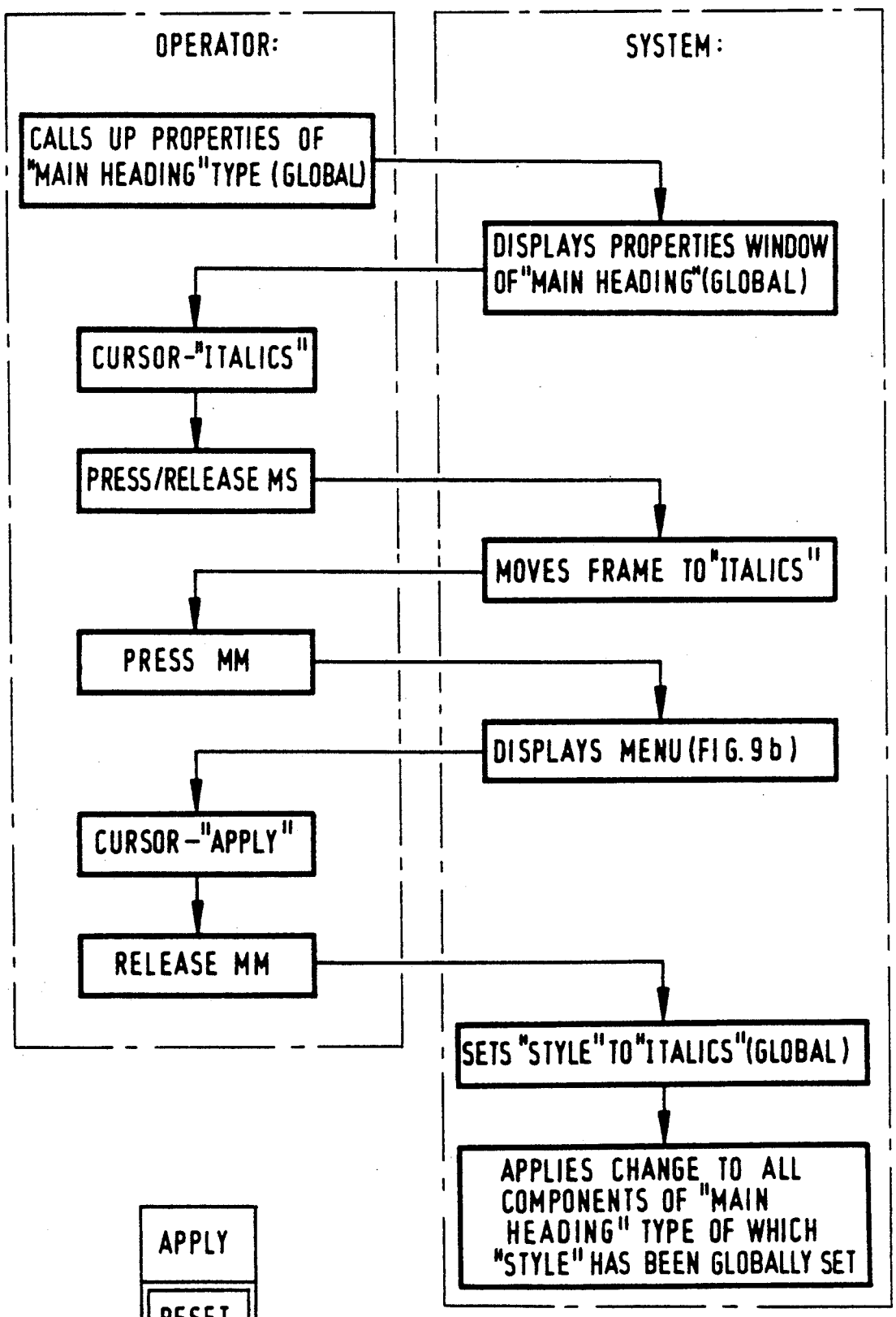
FIG. 9a is a diagram of a procedure for changing the global value of properties.

The procedure for changing the global value of properties is shown in FIG. 9a. The example selected is the change of the style of the component "main heading" (20) in the document in FIG. 2 from bold face to italics. In accordance with the procedure indicated hereinbefore, the operator calls up the properties of the component "main heading", brings the cursor in the right-hand part of the properties window level with the label "style" and selects the "italics" field with the mouse selection button MS. The system responds to this by enclosing this field in a black frame and at the same time removing the black frame surrounding the old setting ("bold"). The operator then presses the mouse menu button MM, whereupon the system displays at the cursor the menu as shown in FIG. 9b. This menu contains the fields "apply" and "reset". By indicating the "apply" field with the cursor the operator now gives the system the order to change the style. On release of the menu button MM the system changes the global value of the property "style" to "italics" and then applies this change to all the components of the "main heading" type having a global adjustment for the style. Any components of the "main heading" type in which the style has been set to be locally different are unaffected on this change.

Local Change of the Value of Properties

Figure 10:
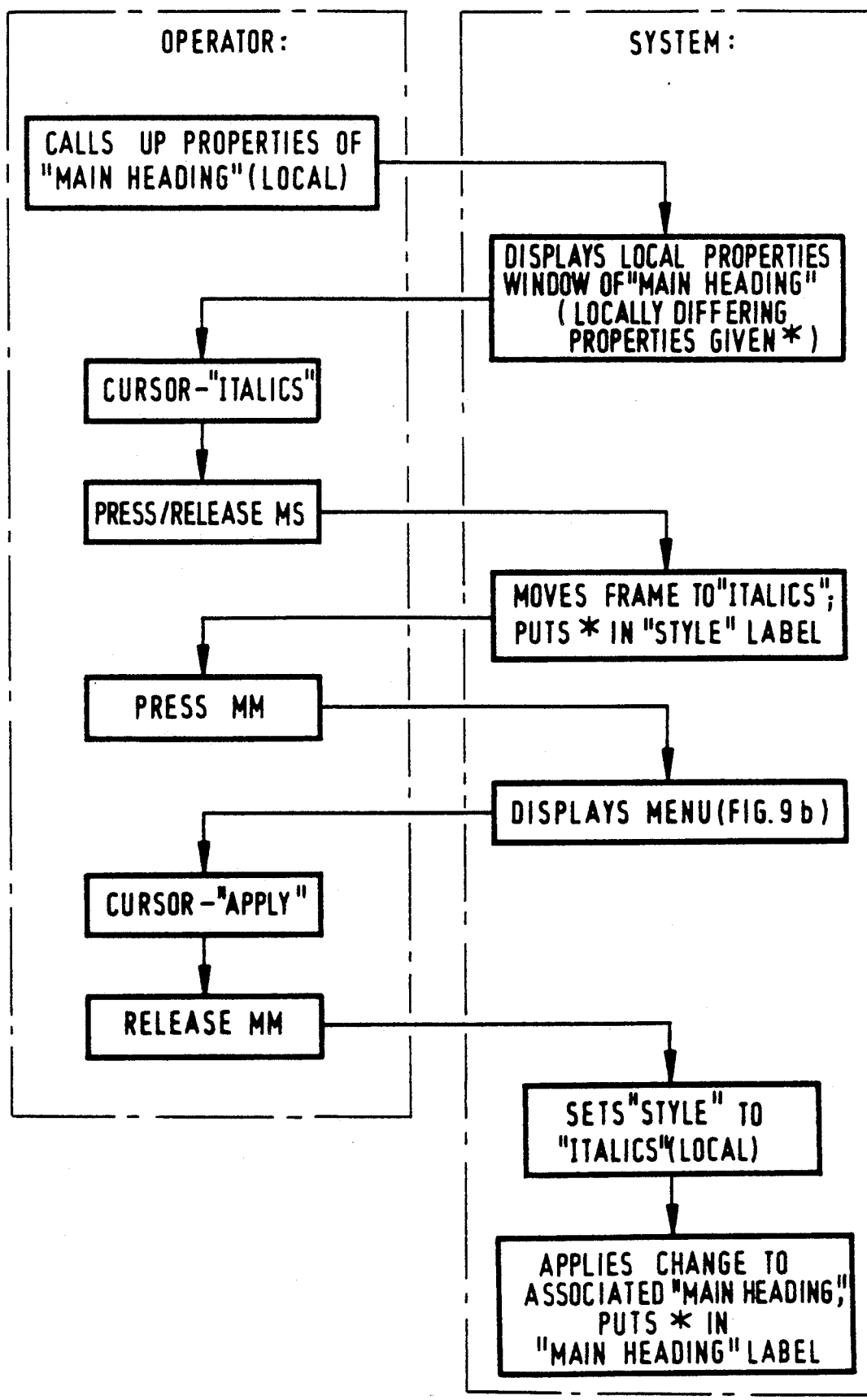
FIG. 10 is a diagram of a procedure for the local change of the value of properties.

The procedure for the local change of the value of properties of a given component is given in FIG. 10. The example selected is the procedure for changing the component "main heading" (20, FIG. 2) from bold to italics. The operator calls up the (locally valid) properties of the component "main heading" in accordance with the procedure described hereinbefore and selects the value "italics" at the "style" label in the right-hand part of the properties window. The system then gives the "italics" value in the properties window a black frame and puts an asterisk in the "style" label in the left-hand part of the properties window. The operator then presses the mouse menu button MM whereupon the system displays the menu as shown in FIG. 9b. In this menu the operator uses the cursor to select the "apply" field and releases the menu button MM. The system now includes the amended value of the style in the local amendments list of the associated component "main heading" and changes the style of this component in the text window. It also puts an asterisk in the components label to show that this component has a locally differently set property.

Resetting a Locally Differently Set Property to the Global Value

Figure 11A:
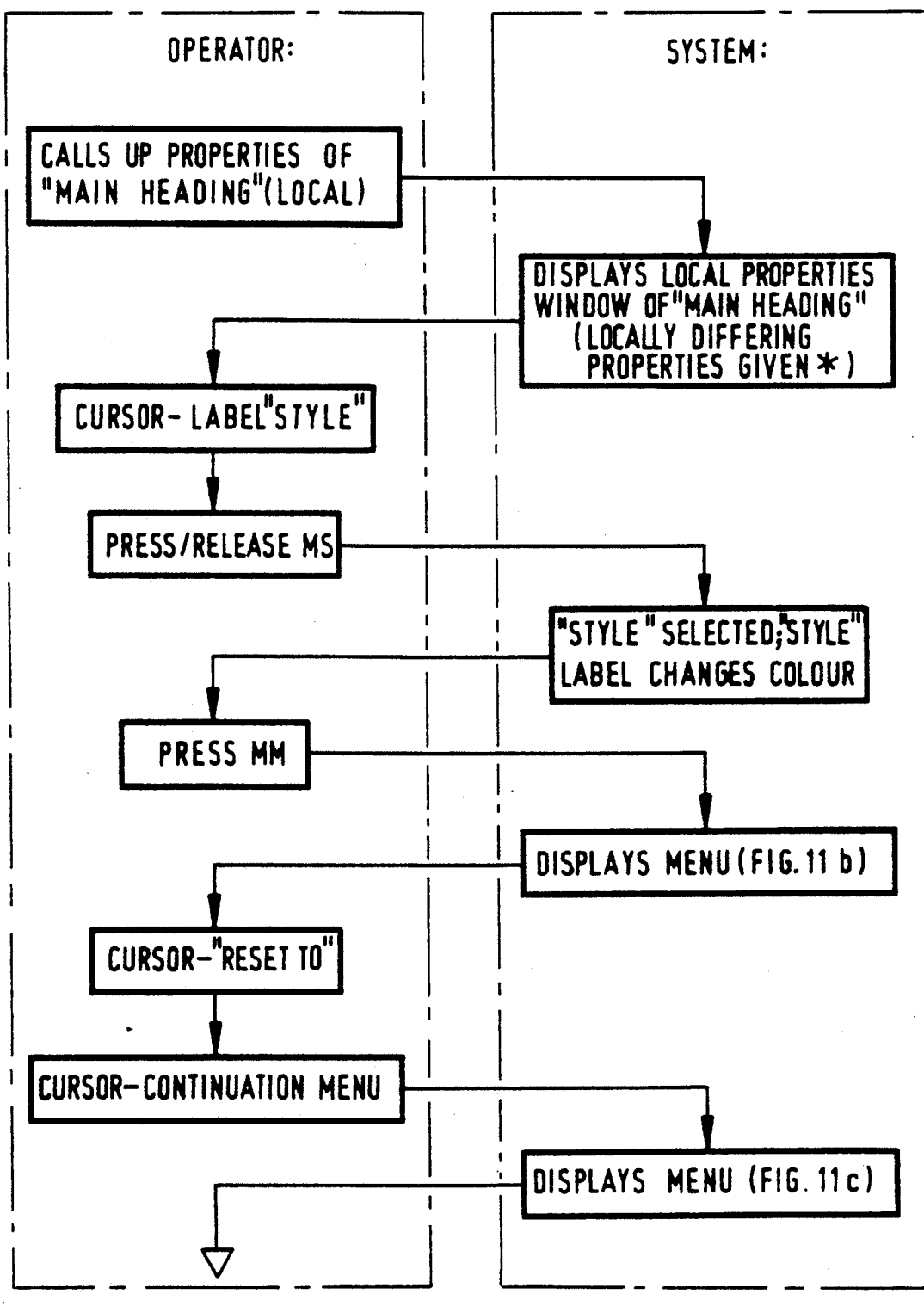
FIG. 11a is a diagram of a procedure for resetting a locally differently set property to the global value.
Figure 11A:
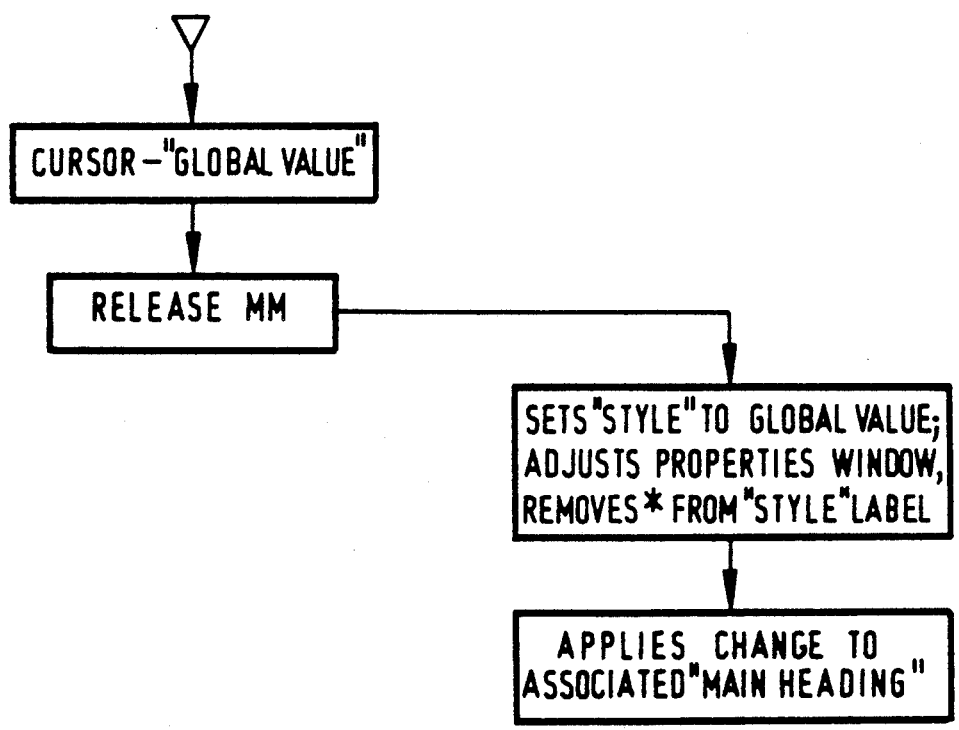

Resetting a locally differently set property to the global value is shown in FIG 11a. As an example, the change in the previously described case will be reversed. Resetting to the global value is of importance because a locally set property cannot be further changed by a global change, even not if the locally set value is coincidentally the same as the global value. For a property of this kind to be subjected to the control of global changes once again this property must be first reset to the global value.

The procedure starts with the operator calling up the (locally valid) properties of the "main heading" component. The system then displays the local properties window of the associated component, the labels of the locally differently set properties being provided with an asterisk. Using the cursor and the mouse selection button MS the operator selects the label "style" in the properties window and then presses the mouse menu button MM. The system shows the menu illustrated in FIG. 11b. In this the operator uses the cursor to select the field "reset to" and then, in the continuation menu (110, FIG. 11c) the "global value" field and releases the menu button MM. The system now changes the local value of the property "style" to the global value, in that the property "style" is removed from the local amendments list of the associated component. The system then changes the set value of the style in the properties window to the global value and removes the asterisk from the "style" label in the left-hand part of the properties window. Finally, the system applies the change to the associated component "main heading" in the text window.

Figure 11B:
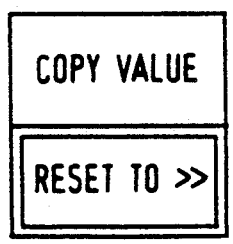
Figure 11C:
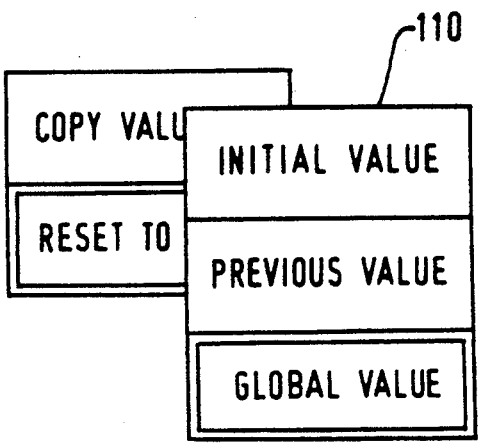

Using the other menu fields shown in FIG. 11b the system offers the opportunity of copying the value of the selected property to another component ("copy value"). Also, as will be seen from the continuation menu 110 (FIG. 11c), the value of a property can be reset not only to the global value but also to the value which was set at the start of the processing of the document ("initial value") or to the previously set value ("previous value").

Change of Properties of Sub-components

Figure 12A:
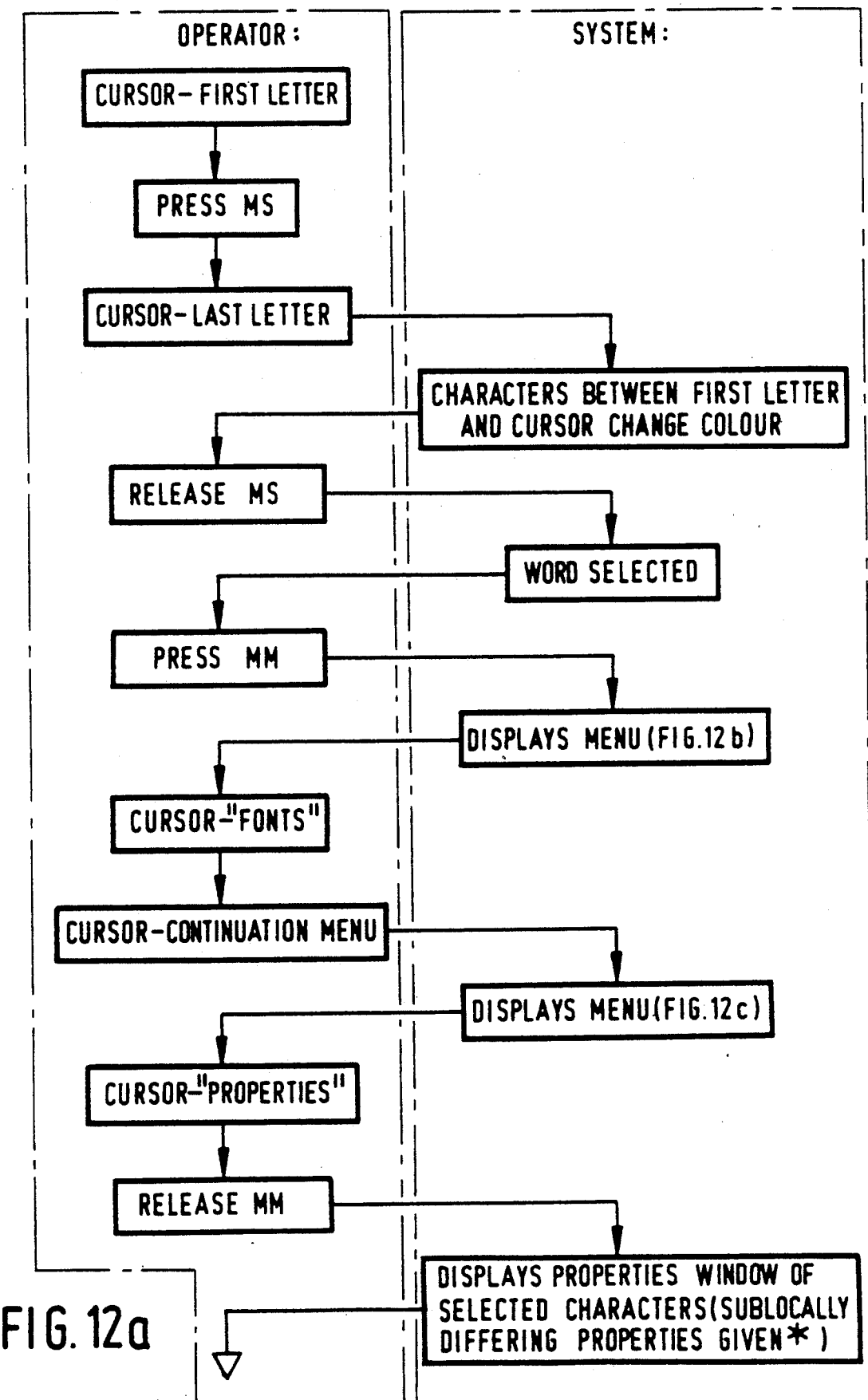
FIG. 12a is a diagram of a procedure of changing the value of properties of sub-components.
Figure 12A:
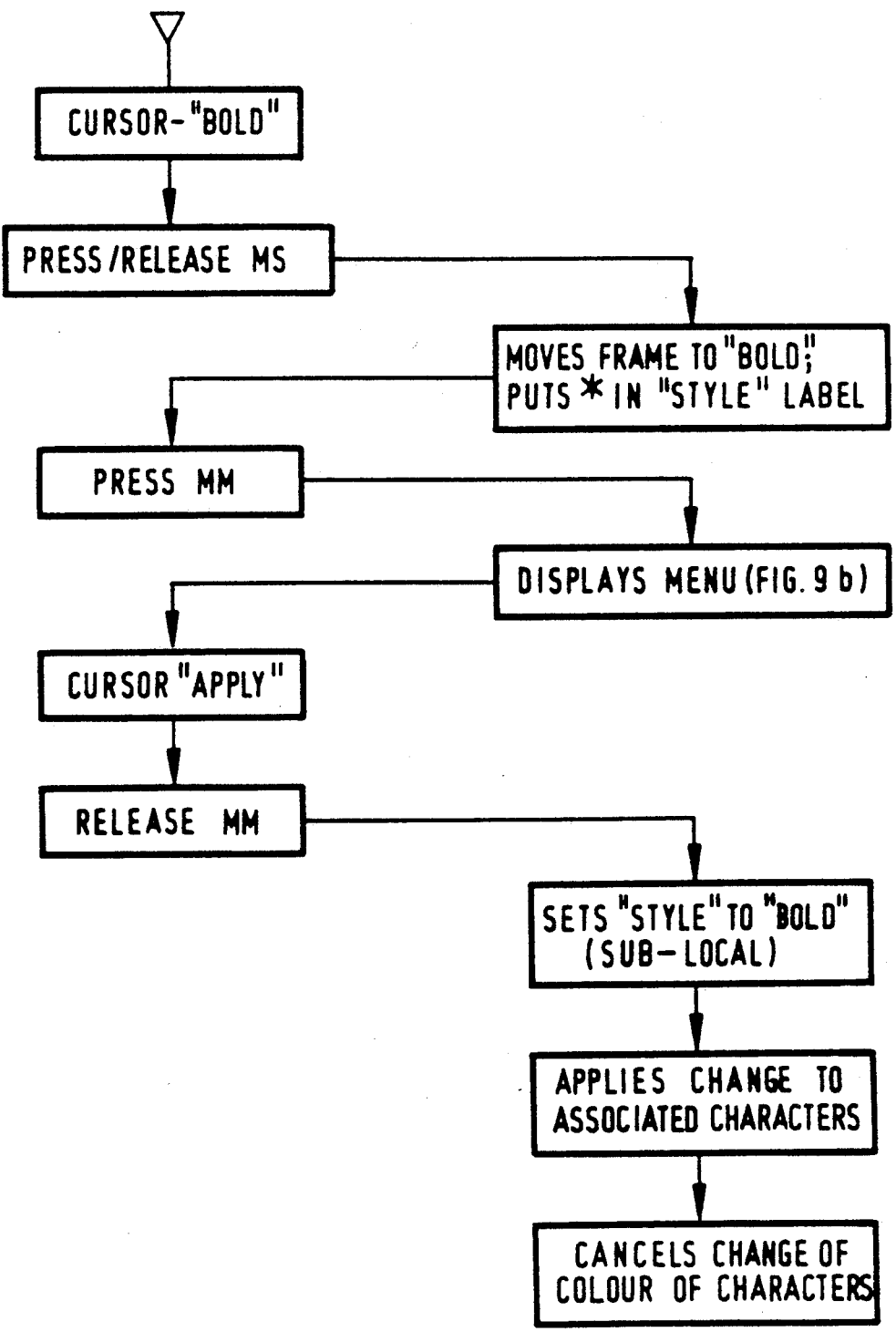
Figure 12B:
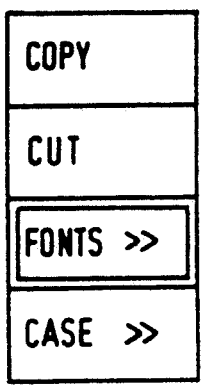
Figure 12C:
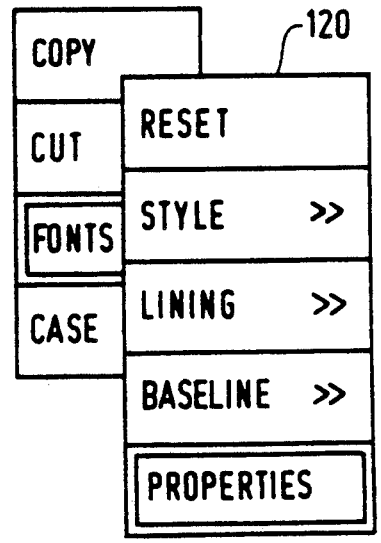

FIG. 12a shows the procedure for changing the value of properties of sub-components, such as alphanumerical characters within a component. In the document shown in FIG. 2 the word "components" in the text block 22 is reproduced in bold face. The following example will shown how this is effected. The text used as a basis is one in which the associated word is still reproduced in normal type. The operator brings the cursor in the text to the first letter of the word and presses the mouse selection button MS. The operator then moves the cursor to the last letter of the word, the system changing the color of all the intermediate letters or reproducing them in reverse video. On arrival at the last letter the operator releases the selection button MS whereupon the system selects the word "components". When the operator presses the mouse menu button MM the system displays at the cursor on the screen the menu, shown in FIG. 12b. This contains a number of system commands (copy, cut) and selection fields for fonts and the capitals and lower case selection ("case"). In the menu the user uses the cursor to select the field "fonts" and then the associated continuation menu. This is shown in FIG. 12c with the reference 120. The continuation menu contains a "properties" field by means of which it is possible to call up the properties window of the selected characters, which now contains only typeface properties, and fields for directly changing the value of properties (this procedure will be discussed hereinafter).

The operator calls up the properties window of the selected characters by indicating the field "properties" with the cursor and releasing the menu button MM. The system then displays the properties window with the properties of the selected characters on the screen. Of course this is only possible if all the selected characters have the same properties. If this is not the case, the system answers by an error display on the screen. If the selected characters have properties differing in value from the corresponding properties of the component of which they form part, these properties will again be indicated with an asterisk, but that is not the case (yet) in the example in question.

In the properties window, the field "normal" at the property "style" has a black frame to indicate that these characters are reproduced in normal typeface. In order that the typeface of the word "components" may be printed in bold type, the operator selects in the properties window at the property "style" the value "bold". This takes place in the same manner as described hereinbefore with reference to FIG. 10.

The system then moves the black frame of the field "normal" in the properties window to the "bold" field and gives the "style" label an asterisk to show that this is a locally differently set property.

The operator then presses the mouse menu button MM, whereupon the system displays the menu as shown in FIG. 9b, moves the cursor in that menu to the "apply" field, and releases the menu button MM. The system then includes the amended value of the "style" in the sub-local amendments list of the selected characters, changes the "style" of those characters in the text window and removes the properties window from the screen, thus completing the change of "style".

Figure 13A:
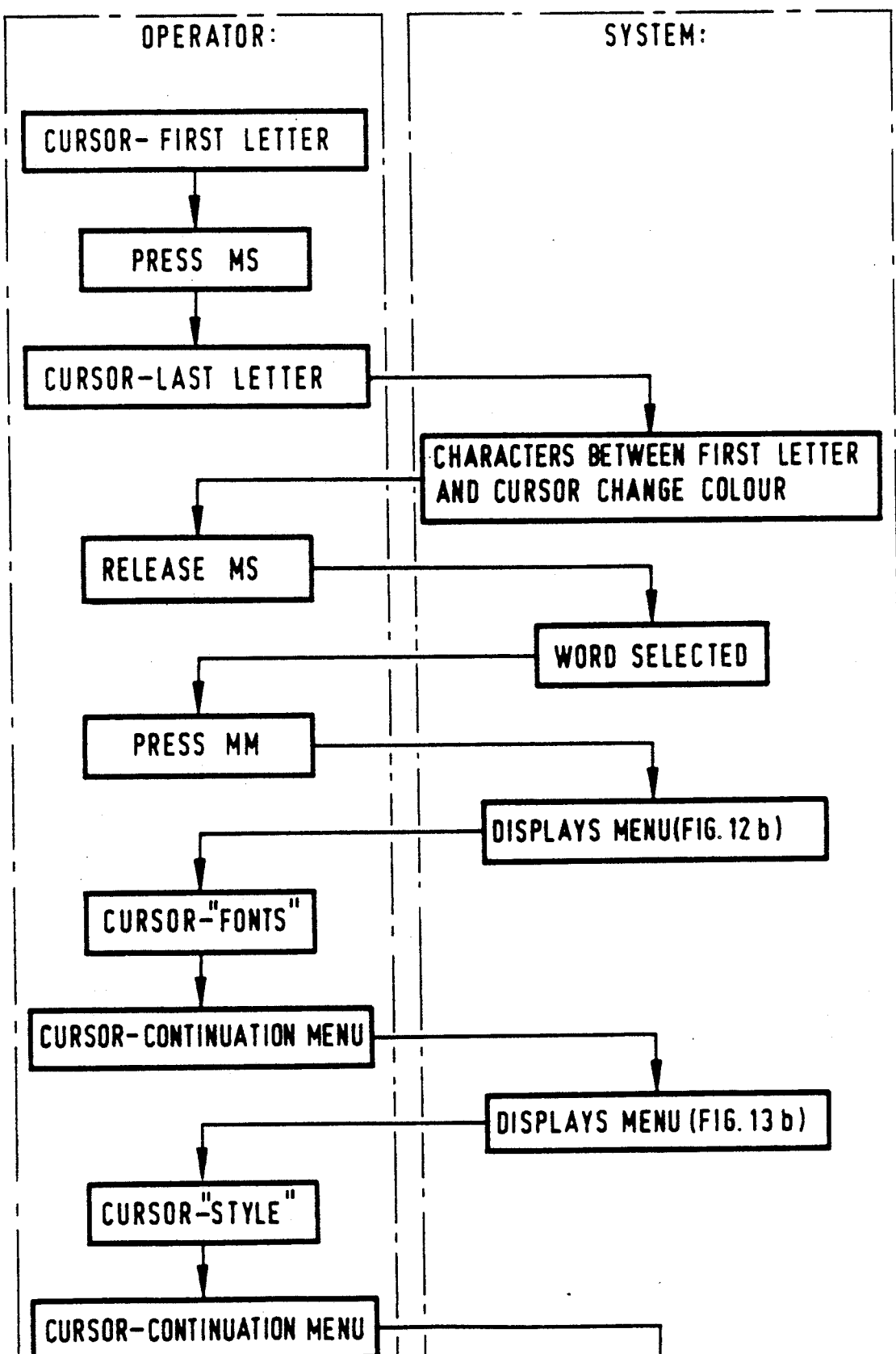
FIG. 13a is a diagram of another procedure of changing the value of properties of sub-components.
Figure 13:
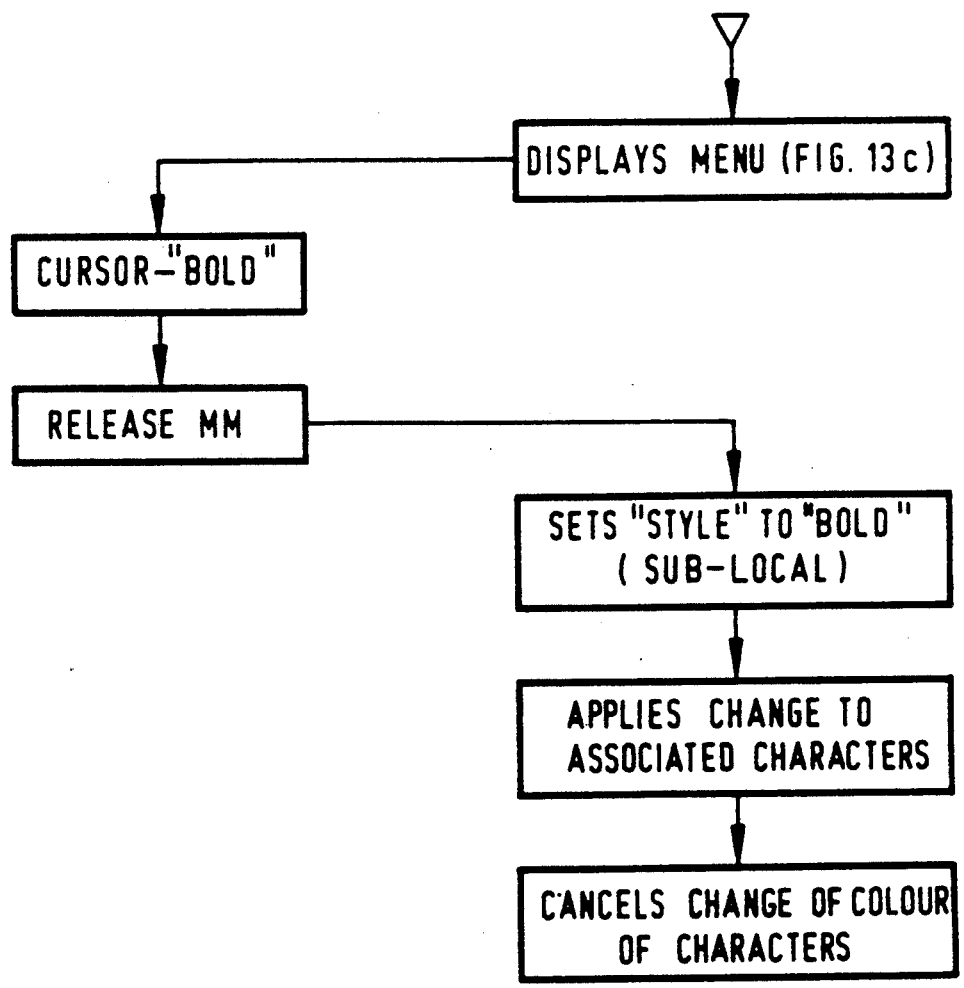
Figure 13:
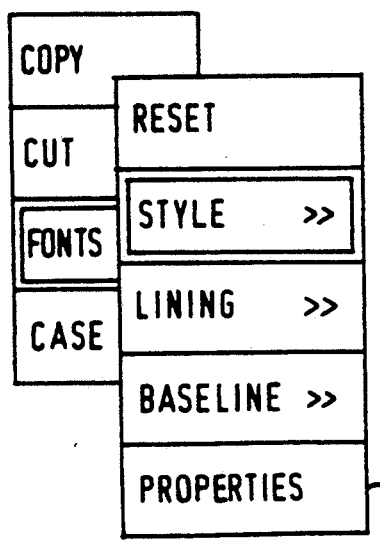
Figure 13:
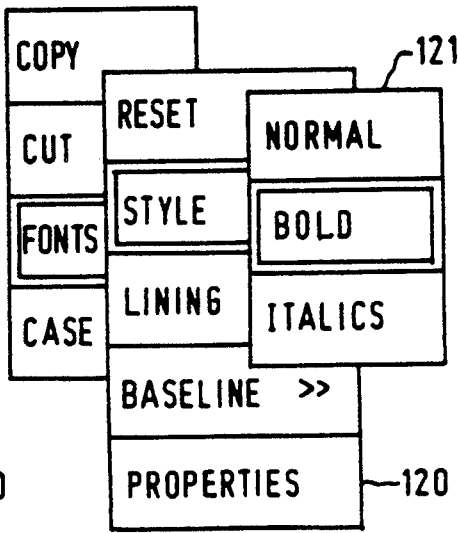

Since changes of style properties occur regularly and the above method requires a fairly large number of operations, the system also has a faster method for this. This method will be described with reference to FIG. 13a. After selecting the required characters (this is done in the same way as in the first method), the operator again presses the mouse menu button MM, selects the "fonts" menu field (FIG. 12b) and then the "style" field in the continuation menu (120, FIG. 13b). The associated continuation menu (121, FIG. 13c) contains the fields "normal", "bold" and "italics".

The operator uses the cursor to select the "bold" field and releases the menu button MM. The system then includes the change in the amendments list of the selected characters, changes the style of those characters in the text window and removes the menus from the screen.

Removal of a Properties Window from the Screen

Figure 14A:
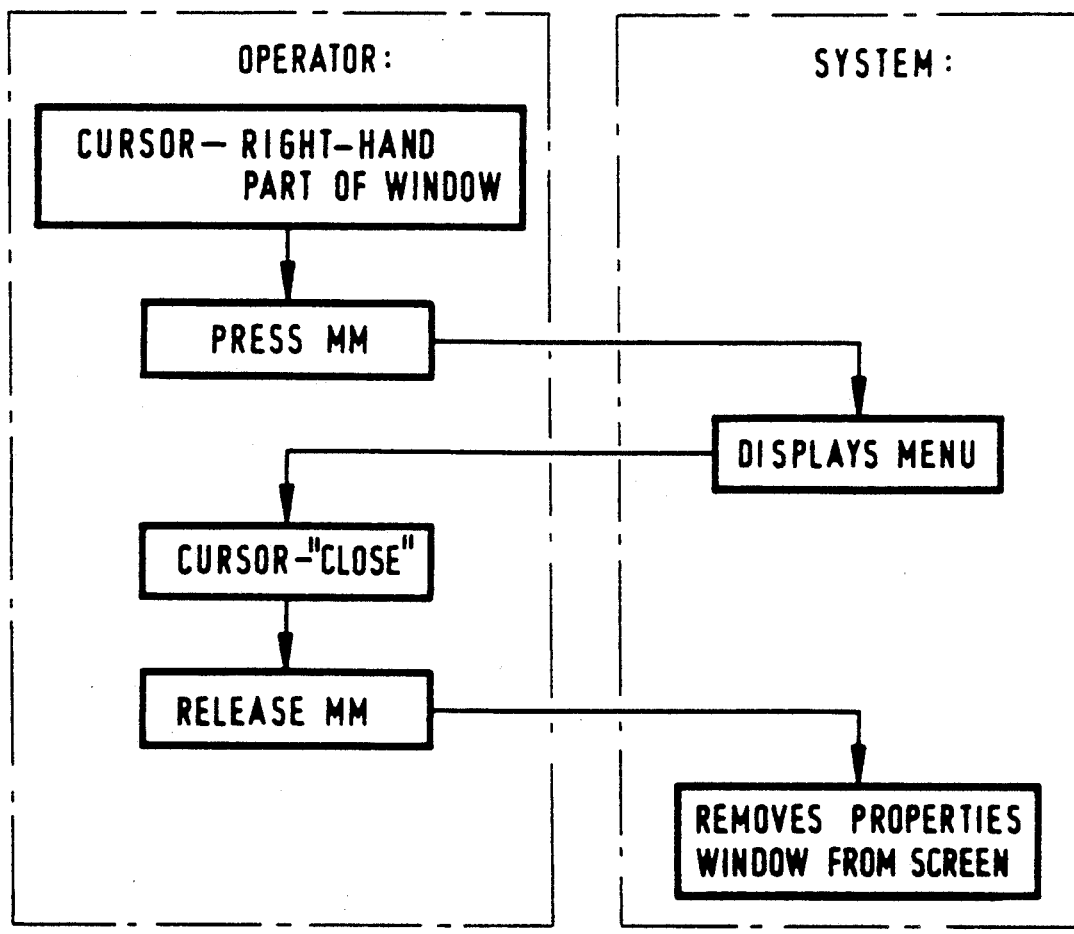
FIG. 14a is a diagram of a procedure for removing a properties window from the screen.
Figure 14B:
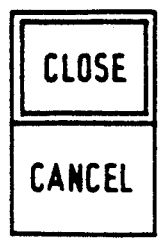

In order to take the processing of a document further, the properties window must first be removed from the screen. This can be done as shown in FIG. 14a by placing the cursor in a blank part of the right-hand part of the properties window and pressing the mouse menu button MM. The system then displays a menu as shown in FIG. 14b. This contains the fields "close" for the immediate removal of the properties window and "cancel" for cancelling the changes shown in the window and then removal of the properties window. By moving the cursor to the "close" field and releasing the menu button MM the operator can make the properties window disappear from the screen and then continue with processing his document.

Although the invention has been explained by reference to the foregoing description and associated drawings, it is not restricted thereto. Numerous alternative embodiments will be obvious to the skilled addressee within the scope of the claims.

System commands could, for example, also be keyed in directly, without the use of a mouse or menus. The commands in the menu in this description have been given solely by way of example and, similarly, the component kinds and component properties described are only a selection of a wider collection.

Moreover, locally or sub-locally differing components and properties can be indicated in all kinds of other ways on the screen, e.g., reverse video or with another color. The way in which the invention is embodied in the system software can be effected in all kinds of ways. Finally, it is also possible to use the invention in systems based on a hierarchic document-model of components at different levels, each provided with properties having global and local values.

While presently preferred embodiments of the invention have been described in particularity, the invention may be otherwise embodied within the scope of the appended claims.

What is claimed is:

1. A publishing system for editing documents comprising a document display screen, inputting means for inputting text and commands and a processing unit which manages the documents in accordance with a model in which a document comprises one or more individual components characterized by a name and by properties having an adjustable local value, each individual component belonging to a component type having the same name as that individual component, a component type being characterized by that name and by the same properties as that individual component, the properties of a component type having an adjustable global value; said processing unit including management means for maintaining and displaying on command on the display screen the values of said properties, wherein said maintaining comprises linking the local value of property of an individual component to the global value of the same property of the component type of that individual component such that it is kept the same as the said global value, and changing on command of an operator the local value of a property of an individual component, thereby unlinking it from the corresponding global value; wherein said management means performs, in response to a change, on an operator command, of the global value of a property of a component type, the same change on the local value of the same property only of those of the individual components of that component type of which the local value of the said property is linked to the said global value; and wherein said displaying on the display screen comprises displaying an indication of local values of properties unlinked form corresponding global values.

2. A system according to claim 1, wherein in the display of a document on the display screen the management means indicate what components have properties having a local value unlinked from the corresponding global value.

3. A system according to claim 1, wherein in the display of the local value of properties of an individual component on the display screen the management means indicate what properties have a local value unlinked from the corresponding global value.

4. A system according to claim 2, wherein in the display of a document on the display screen the management means provide with a first identification symbol those components having properties of which the local value is unlinked from the corresponding global value.

5. A system according to claim 3, wherein in the display of the local value of properties of an individual component on the display screen the management means provide with a second identification symbol those properties that have a local value unlinked from the corresponding global value.

6. A system according to claim 1, 2, 3, in which said components comprise one or more sub-components, each of which has a number of the properties of the said component, the properties of a sub-component having an adjustable sub-local value, and in which said management means are also adapted for maintaining and displaying on command on the display screen the sub-local values of said properties, wherein said maintaining comprises linking the sub-local value of a property of a sub-component to the local value of the same property of the component to which the said sub-component belongs such that it is kept the same as the said local value, and changing on command of an operator the sub-local value of a property of a sub-component, thereby unlinking it from the corresponding local value; wherein said management means performs, in response to a change, on an operator command, of the local value of a property of a component, the same change on the sub-local value of the same property only of those of the sub-components of that component of which the sub-local value of the said property is linked to the said local value; and wherein said displaying on the display screen comprises displaying an indication of sub-local values of properties unlinked from corresponding local values.

7. A system according to claim 6, wherein in the display of the sub-local value of properties of a sub-component on the display screen the management means provide with a third identification symbol those properties that have a sub-local value unlinked from the corresponding local value.

8. A method of use in a document publishing system comprising a document display screen, inputting means for inputting text and commands and a processing unit which manages the documents in accordance with a model in which a document comprises one or more individual components characterized by a name and by properties having an adjustable local value, each individual component belonging to a component type having the same name as that individual component, a component type being characterized by that name and by the same properties as that individual component, the properties of a component type having an adjustable global value; said method comprising maintaining and displaying on command on the display screen the values of said properties, wherein said maintaining comprises linking the local value of a property of an individual component to the global value of the same property of the component type of that individual component such that it is kept the same as the said global value, and changing on command of an operator the local value of a property of an individual component, thereby unlinking it from the corresponding global value; whereby, in response to a change, on a operator command, of the global value of a property of a component type, the same change is carried out on the local value of the same property only of those of the individual components of that component type of which the local value of the said property is linked to the said global value; and wherein said displaying on the display screen comprises displaying an indication of local values of properties unlinked from corresponding global values.

9. A method according to claim 8, wherein in the display of a document on the display screen an indication is given as to what components have properties having a local value unlinked from the corresponding global value.

10. A method according to claim 8, wherein in the display of the local value of properties of an individual component on the display screen an indication is given as to what properties have a local value unlinked from the corresponding global value.

11. A method according to claim 9, wherein in the display of a document on the display screen components having properties of which the local value is unlinked from the corresponding global value are provided with a first identification symbol.

12. A method according to claim 10, wherein in the display of the local value of properties of an individual component on the display screen the properties that have a local value unlinked from the corresponding global value are provided with a second identification symbol.

13. A method according to claim 8, 9, 10, in which said components comprise one or more sub-components, each of which has a number of the properties of the said component, the properties of a sub-component having an adjustable sub-local value, and in which said method also comprises maintaining and displaying on command on the display screen the sub-local values of said properties, wherein said maintaining comprises linking the sub-local value of a property of a sub-component to the local value of the same property of the component to which the said sub-component belongs such that it is kept the same as the said local value, and changing on command of an operator the sub-local value of a property of a sub-component, thereby linking it from the corresponding local value; wherein, in response to a change, on an operator command, of the local value of a property of a component, the same change is carried out on the sub-local value of the same property only of those of the sub-components of that component of which the sub-local value of said property is linked to the said local value; and wherein said displaying on the display screen comprises displaying an indication of sub-local values of properties unlinked from corresponding local values.

14. A method according to claim 13, wherein in the display of the sub-local value of properties of a sub-component on the display screen the properties that have a sub-local value unlinked from the corresponding local value are provided with a third identification symbol.

* * * * *

UNITED STATES PATENT AND TRADEMARK OFFICE
CERTIFICATE OF CORRECTION

PATENT NO.  : 5,001,654

DATED       : March 19, 1991

INVENTOR(S) : Werner J. Winiger, et al

It is certified that error appears in the above-identified patent and that said Letters Patent is hereby corrected as shown below:

In Claim 1, column 12, line 67, the word "a" should appear after "of" (first occurrence).

In Claim 6, column 13, line 36, the word "or" should appear after "2,".

In Claim 13, column 14, line 50, the word "or" should appear after "9,".

In Claim 13, column 14, line 63, the word "linking" should be --unlinking--.

Signed and Sealed this

Thirteenth Day of October, 1992

Attest:

DOUGLAS B. COMER

*Attesting Officer*    *Acting Commissioner of Patents and Trademarks*